United States Patent [19]

Phillips

[11] Patent Number: 4,541,752

[45] Date of Patent: Sep. 17, 1985

[54] DISPOSAL OF FINE TAILINGS

[75] Inventor: John T. Phillips, Bateman, Australia

[73] Assignee: GHD-Dwyer (WA) Pty. Ltd., Australia

[21] Appl. No.: 447,388

[22] Filed: Dec. 7, 1982

[30] Foreign Application Priority Data

Dec. 9, 1981 [AU] Australia .............................. PF1881

[51] Int. Cl.$^4$ ........................ C02F 1/00; E02D 17/18
[52] U.S. Cl. .................................... 405/129; 405/50; 405/258
[58] Field of Search ................... 405/36, 50, 128, 129, 405/258, 270; 210/170

[56] References Cited

U.S. PATENT DOCUMENTS 3,705,851 12/1972 Brauer ............................. 405/129 X
4,270,875 6/1981 Kainuma ............................. 405/129
4,347,140 8/1982 Condolios et al. ............. 405/129 X

FOREIGN PATENT DOCUMENTS

653329 3/1979 U.S.S.R. .............................. 405/128

Primary Examiner—David H. Corbin
Attorney, Agent, or Firm—Harness, Dickey & Pierce

[57] ABSTRACT

A method of disposal of slurries of fine tailings material comprising construction of a bund, forming a first drainage means underneath said bund and over the area to be covered by said fine tailings adjacent said bund and over the face of the bund to be covered by said fine tailings, depositing the slurries of fine tailings in layers behind said bund and providing second drainage means between said layers in the region adjacent said bund.

57 Claims, 10 Drawing Figures

BUND ZONES

- ▨ VALLEY FLOOR COVERED BY COMPLETE UNDERDRAIN SYSTEM.
- ■ STAGE 1 BUND- OF EVAPORATION DRIED RED MUD OR EARTH MATERIAL.
- ▪ EVAPORATION DRIED RED MUD, UNSATURATED, COMPACTED AT O.M.C.
- ▦ RAPIDLY CONSOLIDATING RED MUD.
- ▤ SLOWLY CONSOLIDATING RED MUD.
- ▦ BUND DRAINAGE SYSTEM.

PROTOTYPE BUND DESIGN WITH DRAINAGE DETAILS

FIGURE 5

TYPICAL PORE PRESSURE DISSIPATION

DISPOSAL OF FINE TAILINGS

This invention relates to the disposal of fine tailings resulting from a mineral processing.

In conventional land disposal of fine tailings (slimes) resulting from manufacturing and/or mineral extraction processes (eg. the extraction of alumina from bauxite) the fine tailings waste is placed behind bund walls of earth and/or rock material. The fine tailings are in semi-fluid state because of high water content and if not confined can only be raised at an angle of a few degrees from horizontal without the risk of flowing or slumping. The bund walls resist the pressure of the semi-fluid fine tailings and by containing the material to allow the tailings to be accumulated in deposits for efficient storage of the waste material.

It is an object of this invention to provide an arrangement of staged bund construction using dried fine tailings material in association with consolidated tailings incorporating specially graded filter zones.

It is a further object of this invention that the various components of the construction act together to provide a structural containment system which can resist all the usual forces resulting from self weight, pressure of semi fluid tailing and earthquake.

It is an object of this invention that little imported earth/rock material is required to construct the containment system.

In one form the invention resides in a method of disposal of slurries of fine tailings material comprising construction of a bund, forming a first drainage means underneath said bund and over the area to be covered by said fine tailings adjacent said bund and over the face of the bund to be covered by said fine tailings, depositing the slurries of fine tailings in layers behind said bund and providing a second drainage means between said layers in the region adjacent said bund.

According to a preferred feature of the invention the bund is formed from dried fine tailing.

According to a further preferred feature of the invention the entire area to be covered by said fine tailings has said first drainage means.

According to a preferred feature of the invention the bund is formed in stages where subsequent stages are supported by both the previously formed stage and drained consolidated tailings material adjacent said stage.

The invention is advantageous where "dry" tailings disposal is being utilised which involves the pumping of thixotropic and/or semi fluid waste at a maximum solids content consistent with pumpability. The solid/water ratio in such tailings is typically about 1.85.

The invention is dependent on means (such as a season of dry weather) whereby sufficient tailings can be dried so as to provide dried tailings at a satisfactory moisture content for construction of the subsequent stage.

The invention may also be used for fine tailings where solid/water ratio is lower and/or where conveyor belts or other systems are used for transport of tailings at various solid/water ratios.

The invention will be more fully understood in the light of the following description of one specific embodiment. The description is made with reference to the accompanying drawings of which:

FIGS. 2.1 to 2.6 illustrate stages in construction of the bund containment wall;

The embodiment relates to a tailing waste system for disposal of red mud which is a normal waste product of a bauxite refinery. The embodiment is based upon a situation where the red mud is disposed in accordance with the embodiment from the commencement date of the operation of the refinery.

Generally the containment bunds for red mud according to the embodiment are designed to the same criteria as an earthern retaining structure such as earth dams except that drainage channels are incorporated in the structures. The material contained behind the "dam" would not be water, but a slowly consolidating red mud. The "dam" itself rather than being constructed of naturally occurring earthern material is largely formed of red mud either compacted or rapidly consolidated by methods discussed below.

Design criteria which must be allowed for and can be accommodated in the system are as follows:
  Stability both during and after construction and under earthquake conditions;
  Drainage in order to dissipate excess pore pressure and accelerate natural consolidation; and
  Erosion protection of downstream face of the bunds.

Figure 1:
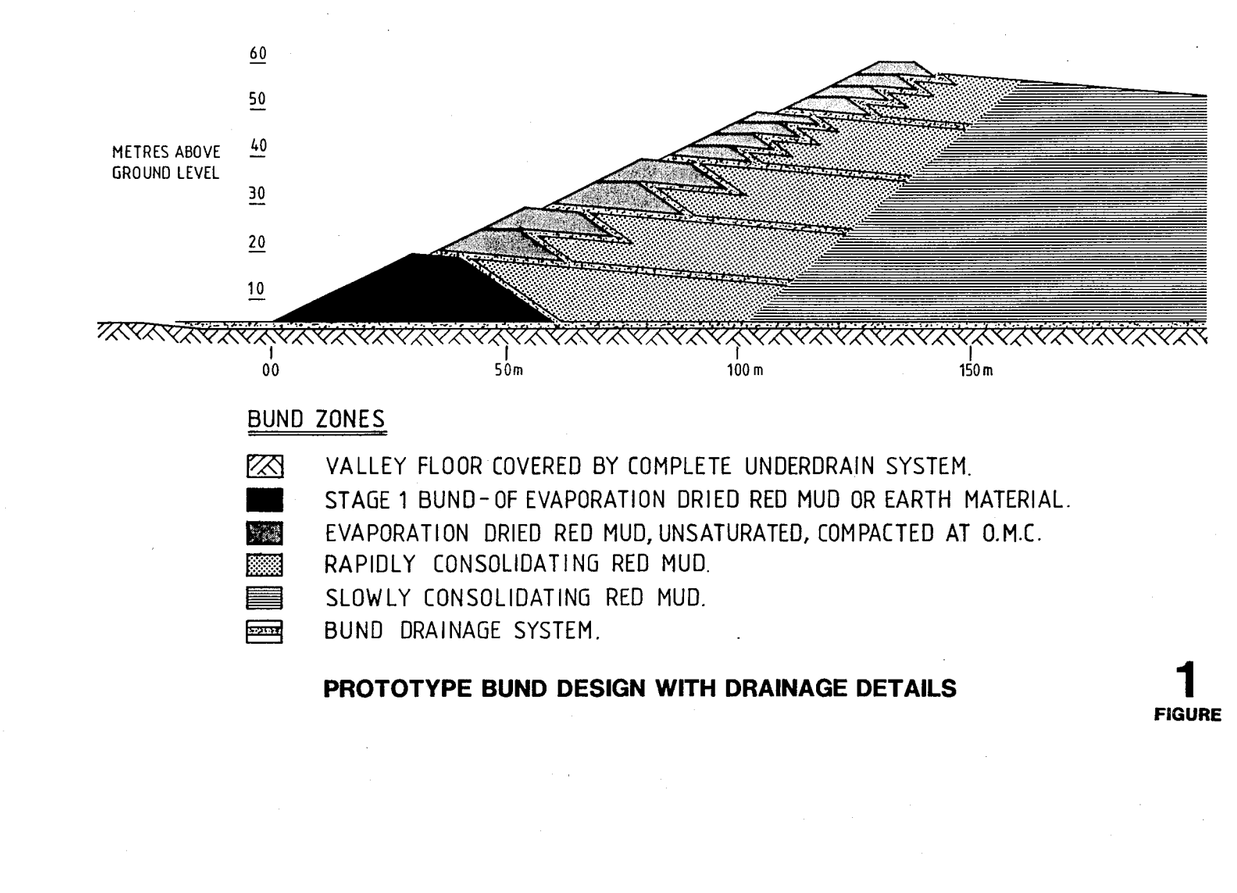
FIG. 1 is a schematic sectional view of a prototype bund design showing drainage details.
Figure 2:
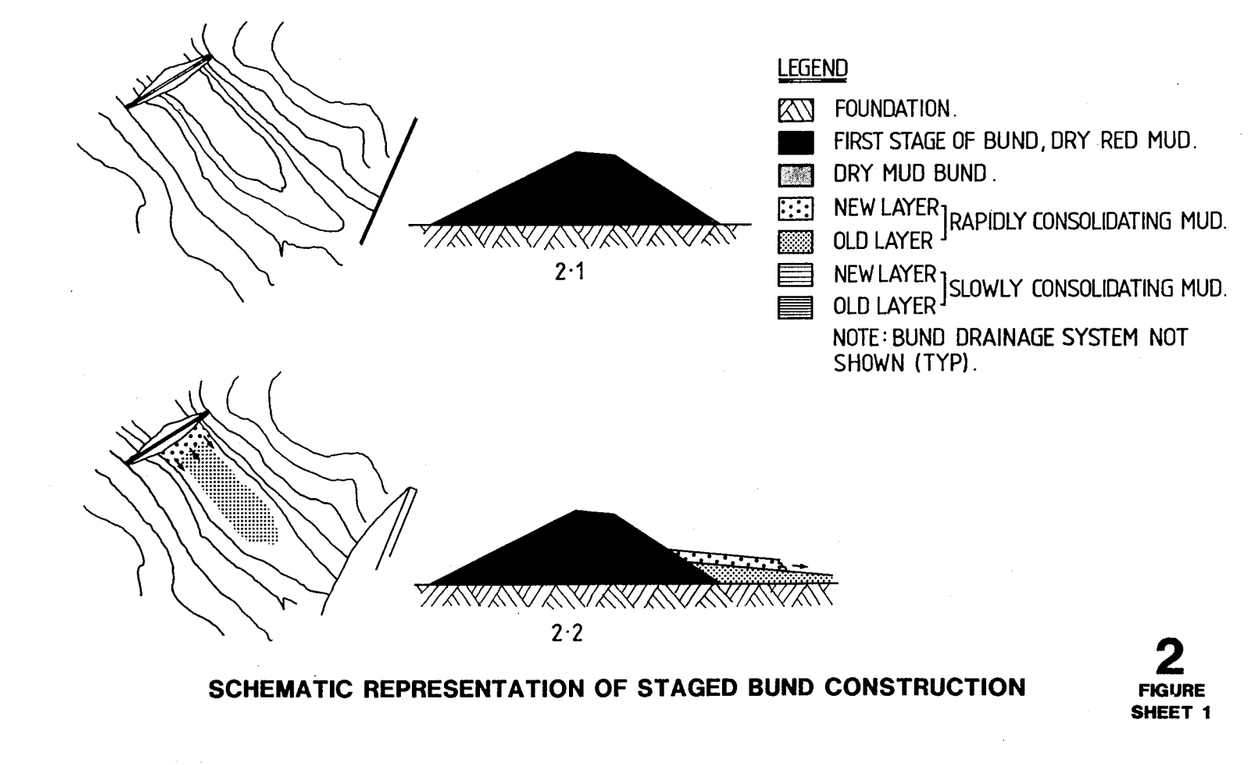

For the case of the embodiment and as illustrated in FIGS. 1 and 2 it is assumed that deposition commences in a valley system and then spills over the valley sides to require containment on all sides in a manner similar to that required for flat land deposition.

The lift height for various stages may be adjusted to suit the requirements of the site and refinery. The example illustrated at FIGS. 1 and 2 commences with a 15 meter high bund followed by smaller lifts corresponding to similar storage volumes on larger areas of deposition and the final lifts are as small as 2.5 meters.

For the deposition system according to the embodiment each stage of bund construction is founded on mud that had been placed "wet" but which had rapidly consolidated and stabilised, due to specially designed drains, prior to construction of the next stage.

Features of bund construction according to the embodiment and as illustrated in FIG. 1 are as follows:
1. The top half meter of ground surface overburden is stripped and prepared for complete underdrain system the nature of which is discussed subsequently.
2. At the commencement of disposal from a new refinery the first stage of the bund is most conveniently constructed of local earth material as air dried red mud is unlikely to be available at that stage. When, the second stage bund becomes necessary, it is likely that a sufficient volume of dried mud will be available but this would depend on time scale and seasons. Alternatively other earthern materials could be used.

For other stages because of longer time scale red mud dried through evaporation will be available.
3. The mud is expected to be able to dry to near optimum moisture content during the maximum evaporation drying periods (eg. summer months). This material has been shown in undrained triaxial tests to have typical shear strength (c=160 kPa, $\phi=18°$). Volumes of mud available during the period of maximum evaporative drying have been shown to suffice for typical bund construction.

4. The mud adjacent to the bund is initially deposited "wet" on to a sand drainage blanket. This is designed to extend sufficiently to drain the mud to give adequate strength and stability before the mud is required to lend support to the retaining structure and serve as the foundation of the dry mud bund of the next stage of construction.

5. The bulk of the wet mud is deposited behind the bund and will consolidate naturally, although without special drainage this will be relatively slow. For stability analysis of the system it is not assumed to lend support to the retaining structure and in designing for the worst case it is assumed to have liquified under earthquake loading.

6. The design and construction aspect of the drainage system required to accelerate consolidation of red mud adjacent to the dry mud bunds are discussed at a later stage in the specification.

The method of red mud disposal according to the embodiment involves containment of the mud at all times within either a valley or within perimeter bunds. This ensures that even under liquefaction conditions the mud stacks can be raised without risk of accidental spillage. Additionally it is important that a zone of drained mud is formed in the immediate vicinity of the bunds walls to form a stable base for the next stage of bund construction. The zone of drained mud contributes significantly to the strength of bund wall system.

Figure 3:
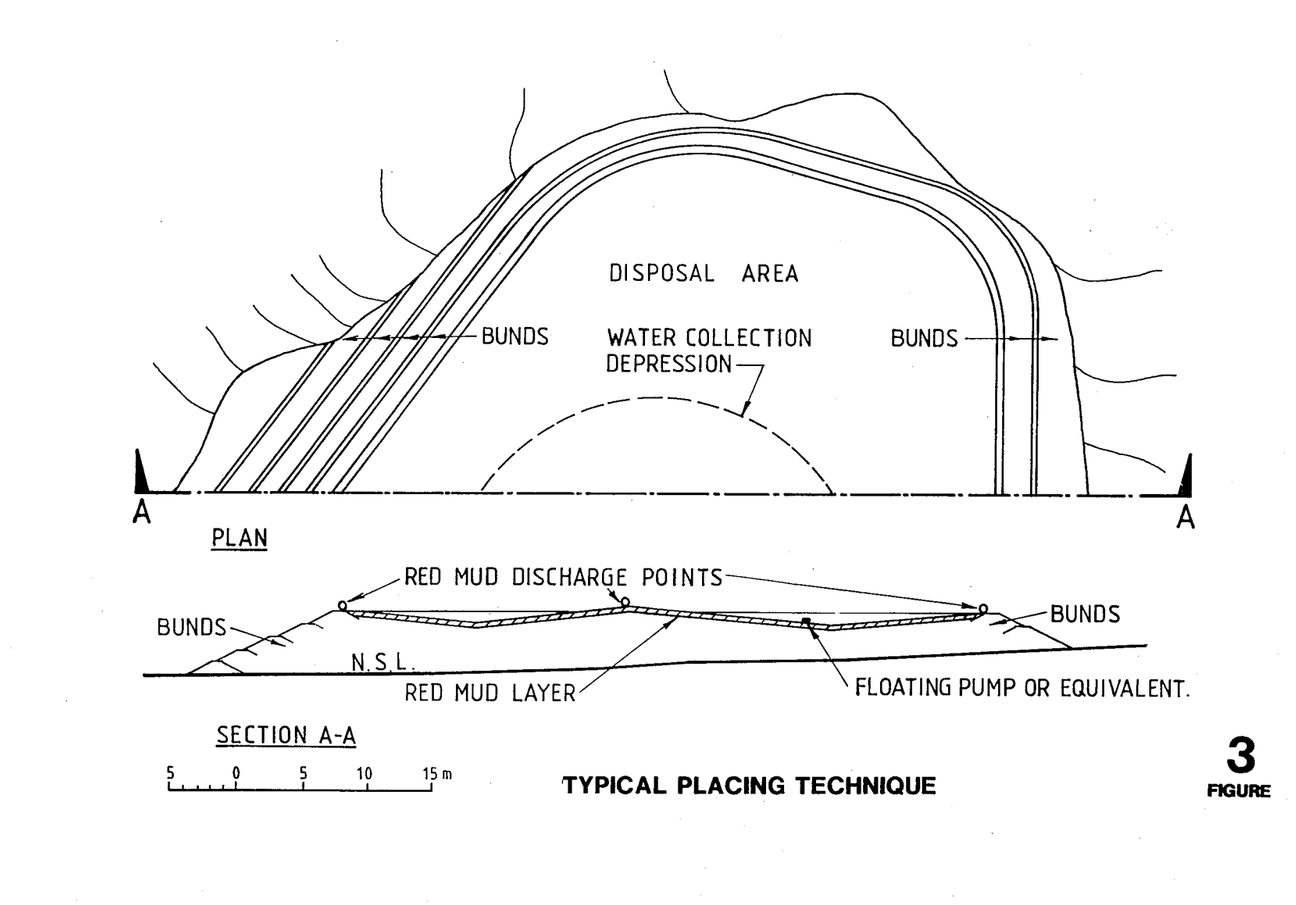
FIG. 3 illustrates the placement technique for the tailings behind the bunds.

To produce the necessary controlled build-up of mud against the bund walls a perimeter pipe around the top of the bund with numerous spaced discharged points can be utilised. Refer to FIG. 3 for a typical illustration. However, the mud will likely assume a flow angle of around 5°, and will therefore form a slope away from the bund (see FIG. 3). The desired capacity of each stage height will therefore not be achieved unless additional placing techniques are used. To offset this volume reduction a central discharge pipeline could be established on a frame built to the appropriate height to fill the cone of depression of mud generally follows that placed by the maximum possible time to drain for stability. The perimeter mud also forms the basic material when dry for further bund construction. Discharge of mud from perimeter and central outlets forms a concentric drainage moat which traps surface runoff some distance in from the perimeter of dykes, thus avoiding saturation and scouring of the perimeter bunds. Any scoured mud produced by such runoff remains within the disposal area, to either settle out naturally or as a result of the addition of lime to the water. The trapped internal runoff can be removed and pumped or drained as decant water for recycling etc. as needed for the process.

According to the embodiment the red mud disposal areas require an underdrainage system to minimise the tendency of contaminated water to enter the underlying ground; to allow dissipation of pore pressures resulting from mud stacking and; to allow control of the drainage from the mud.

The volume of contaminated water entering the drains is dependent on consolidation conditions (time and thickness of layer), on evaporation effects and on gravity drainage. Under flow rates from the mud stack will vary with the changing load conditions as the stack is increased in height.

It has been calculated that for the embodiment initial outflow rates from a typical mud stack may reach an order of 6 megaliters per hectare per annum. This represents a flow rate which may be beyond the discharge capacity of naturally occurring surface materials such as gravels sands etc. With the embodiment natural surface materials can be screened into a gravel fraction and a sand fraction with typical permeabilities that may be achieved in each division being $1 \times 10^{-4}$ m/s for clean gravel (2-20 mm sieve) and $1 \times 10^{-5}$ m/s for fine sand (0.06-2 mm sieve).

A typical drainage blanket according to the embodiment is approximately 0.5 meters thick and is divided into a 0.35 meter depth gravel underdrainage blanket with an overlying 0.15 meter depth of sand filter. The purpose of the sand filter is to prevent "piping" or the passing through of the fine grained tailings particles into the underdrainage blanket.

It should be appreciated that the under drains, are specifically designed for the material and solid/water content applicable to a particular project.

As an additional measure, a series of agricultural drains (tile drains) are incorporated in the drainage layer, ensuring rapid discharge of water under controlled conditions. These drains also have the advantage of allowing air to enter beneath the stack, thus guaranteeing that positive pressures cannot develop in the drain system. If desired the agricultural drains constructed in the drainage layer, may angle across contour to limit the velocity of drainage water in the drains.

Where there are environmental requirements to prevent seepage losses of chemical contaminants as with the embodiment a clay sealing blanket may be employed below the drainage blanket. In such a case the clay layers underlying the surface gravels will require compaction and trimming prior to the placement of the gravel blanket drain to ensure that all high permeability features such as root holes, shrinkage cracks, sand layers, etc. are removed.

In construction of the bund horizontal drains are required in the mud deposited immediately behind the bund to accelerate the rate of consolidation, and hence provide stability in this critical region. The drains are placed to shorten the drainage path for porewater movement through the deposited mud to allow the majority of consolidation to take place between construction of successive stages of the outer retaining bunds. The size of drains are such as to accommodate a typical maximum monthly flow, which can be calculated from the change in moisture content in the various layers of mud as a result of consolidation. Should a permeable sand blanket be used for the drainage system, constructional limitation will control the thickness of the blanket since the minimum sand blanket that could be laid accurately by construction equipment is currently of the order of 200 to 300 mm thickness. Placement of a sand blanket on the upstream face of dry mud bunds would require a minimum thickness of sand of some 400 mm and would limit these slopes to 30° (1 to 1.7), which is the natural angle of repose of the sand drain material and the placement of wet mud against the sand drain must be careful carried out to avoid disturbing the sand blanket.

The horizontal drains feed into pipes which pass the consolidation water through the bund to discharge into channels on the downstream face of the bund. These channels are designed to prevent erosion of the downstream face of the bund.

The horizontal extent of the horizontal drains upstream is approximately 50 m from the face of the bund, as shown in FIG. 1. However, the precise extent is controlled by the position of the critical slip surface determined during stability analysis and can be optimized in the design stage.

If desired a filter layer can be placed above the horizontal drains to prevent the ingress of the fine mud particles into the coarser material of the drain. The filter layer may consist of layers of sand or of filter cloth. Other options to be considered in the construction of drains include parallel agricultural drains, strips of sand drains or plastic drains.

Consolidation and the consequent gain in strength and stability of the red mud adjacent the upstream face of the bund, is critical to bund design. Consolidation under the selfweight of mud is not always 100% complete before the next layer of mud is added but the consolidated analysis allows the calculation of actual pore water pressures at any time and hence calculation of effective overburden pressures for use in stability analyses of the bund.

It is believed that settlement under selfweight of the red mud stacks (which can locally be as high as 60 meters) could be in excess of 10%. As the bulk of the red mud stack does not have internal drains, the length of drainage path for pore water increases with stack height and hence the rate of settlement decreases. Overall, more than 50% of the total settlement is expected to occur during the active disposal life of the stack, hence it may be possible that a further five percent of material could be deposited above the theoretical volume of the stack. Differential settlements due to increased rate of settlement in the well-drained area adjacent to the dry mud bunds can be accounted for in design.

Test results show a range of consolidation rates for red mud, varying with overburden pressure and possible lime content, between $0.3 \times 10^{-6}$ m$^2$/sec and $2.2 \times 10^{-6}$ m$^2$/sec. The average figure, corresponding to red mud with $\frac{1}{2}$% lime content and an overburden pressure of between 100 and 200 kPa, is $1.3 \times 10^{-6}$ m$^2$/sec.

Figure 4:
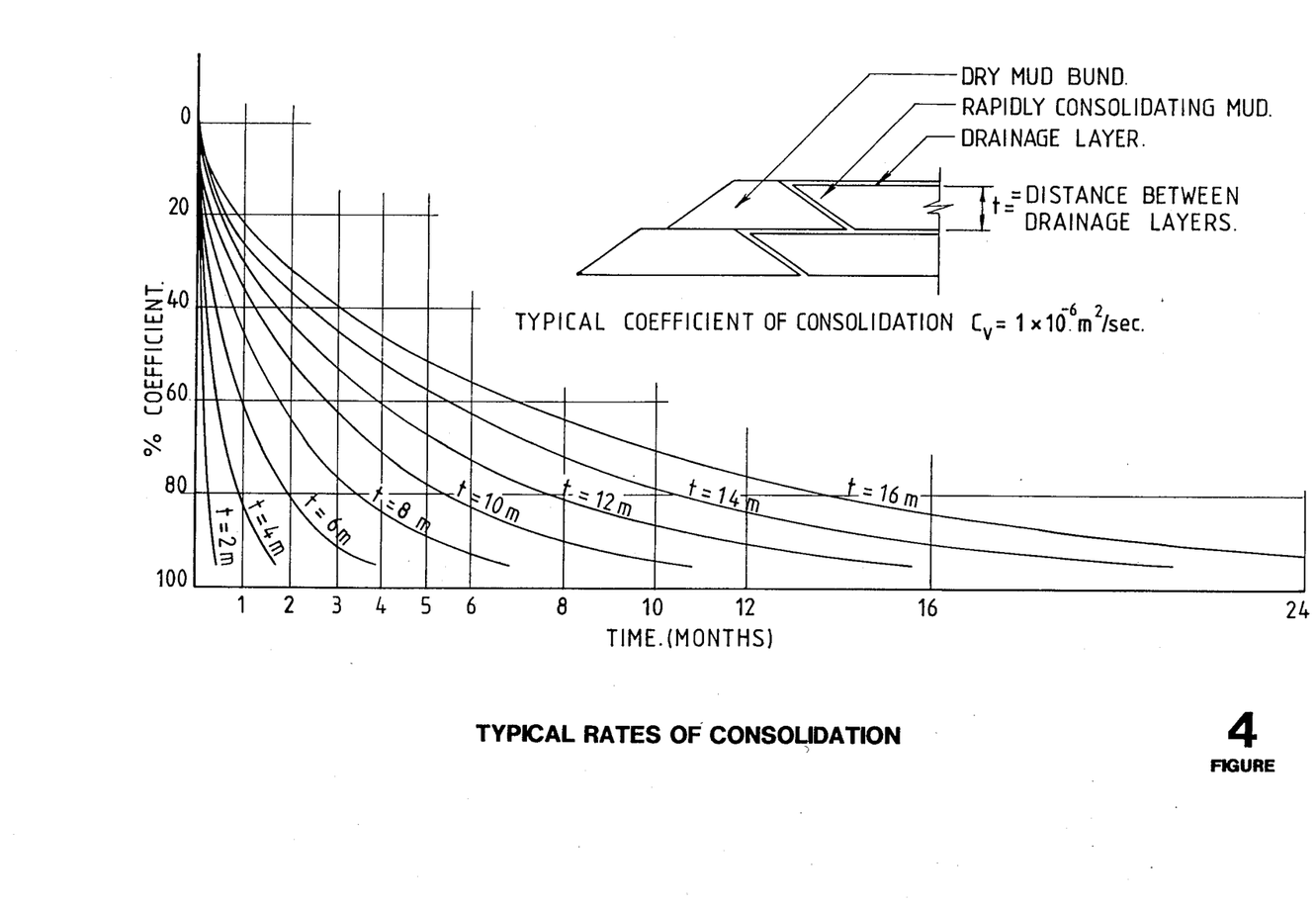
FIG. 4 is a graphical illustration of the consolidation ratio of typical red mud tailings for varying thicknesses of red mud layers having drains located between each layer.

A plot of consolidation against time is shown in FIG. 4 for various drainage paths. This shows that to achieve the majority of consolidation during the one year interval between probable successive loadings, horizontal drains systems spaced vertically every 10 meters would be adequate.

The interval between successive deposition of mud layers increases in an exponential manner from one day in the first interval to about 100 days for the fifth interval (assuming deposition in 2.3 m layers). Mud deposited in the initial layers would not have sufficient time to fully consolidate before successive loads are applied. Calculations show that this problem is not critical as the initial enbankment would be designed to contain the first year's disposal requirements for the area under consideration and would have inherent strength to support all the wet mud during the consolidation cycle. The net effect is that the layers built up behind the first bund will have largely consolidated and gained sufficient stability, despite an initial build up of excess pore pressures, by the time the second stage embankment is constructed above it.

Figure 5:
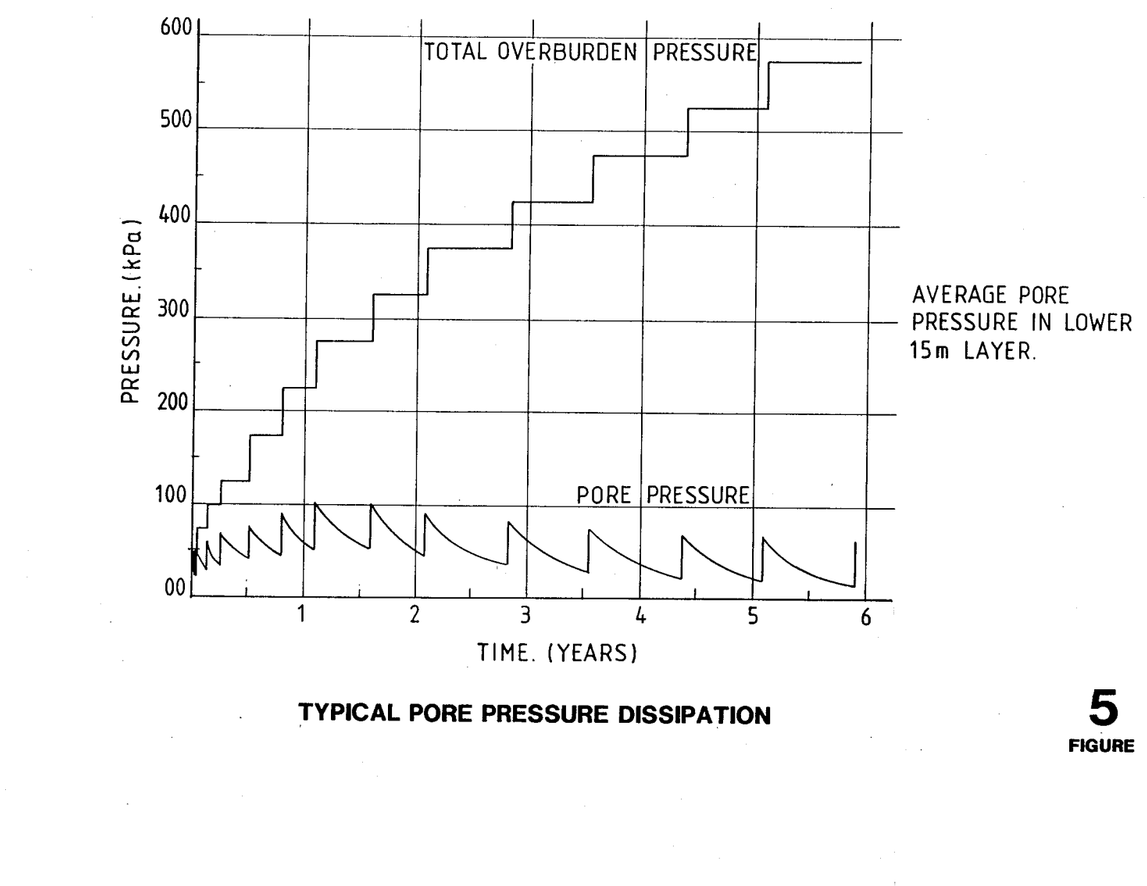
FIG. 5 is a graphical illustration of the pore pressures induced in the drainage consolidated layers of a typical red mud with increased over burden pressure.

The dissipation of pore pressure with time for the mid point of the lowest layer is shown graphically at FIG. 5. The effect of the increments in load is apparent, but it can be seen that the pore pressures never exceed 100 kPa, and that over a long period the general trend is towards an overall dissipation of pore pressure. Calculations for upper layers indicate even lower pore pressures. The above calculations are conservatively based on instantaneous placement of layers between drains, and refinements taking into account the actual time sequence indicate further reduction in pore pressures.

Evaporative drying from the surface of the mud will remove a considerable volume of water. Evaluation of the net effective evaporation (actual evaporation less rainfall) shows that positive evaporation is seasonal. In southern parts of Western Australia for instance it occurs only for approximately 6 months each year—from October to April. The depth to which evaporation will dry the mud is variously reported as being from 0.5 meters to 2.0 meters.

The quantity of red mud that has dried to near optimum moisture content during the summer period under natural evaporation will be limited both in area and the depth of penetration. To limit the amount of dry material being handled for bund construction, the size of bunds will be minimised.

Calculations shows that the provision of drainage layers can dramatically increase the rate of consolidation as indicated by FIG. 4. This is accompanied by a gain in effective shearing resistance of the red mud. Hence, mud initially deposited at 65% solids can within a short space of time be drained to enhance the stability of the embankment. This drained mud immediately behind the bunds is then considered a part of the total stable embankment which contains the bulk red mud behind it.

Drainage cannot be relied upon to dissipate excess pore pressures generated by earthquake in the bulk of the red mud. For design purposes, pore pressures in this material have therefore been taken as equal to the pressure from overlying material, resulting effectively in no strength (liquified).

Analysis show that the factors of safety required for this type of structure can be adequately met by the disposal system according to the embodiment.

It should be appreciated that the above embodiment is described in relation to the disposal of red mud from a bauxite refinery from the date of commencement of the refinery. However, the embodiment may be equally applicable to the disposal of red mud from a refinery which is currently in operation and in such a case the initial stage in the bund construction may utilise previously dried red mud from the refinery.

It should also be appreciated that while the embodiment is directed to the disposal of red mud from a bauxite refinery operating in accordance with the Bayer process that this invention may relate to disposal of any form fine tailings resulting from mineral processing or manufacturing process.

I claim:

1. A method of disposal of slurries of fine tailings material comprising laying a porous drainage level on a subsurface between a leading edge and a trailing edge, construction of a bund upon the porous drainage level and having a front face spaced inwardly from the leading edge of the porous drainage level and a rear face substantially forwardly of the porous drainage level trailing edge for leaving a substantial portion of the porous drainage level exposed, forming a further porous drainage level over the rear face of the bund to be covered by said fine tailings, depositing the slurries of fine tailings in layers behind said bund and at least in part over the porous drainage levels and providing still further porous drainage levels between the layers in the region adjacent said bund and in contact with the further porous drainage level for draining liquid from the layers.

2. A method as claimed at claim 1 wherein said bund is formed substantially from dried fine tailings.

3. A method as claimed at claim 1 wherein the entire area to be covered by said fine tailings is covered by the porous drainage level.

4. A method as claimed in claim 3 wherein the bund is formed in stages where subsequent stages are supported by both the previously formed stage and drained consolidated tailings material adjacent said stage.

5. A method as claimed at claim 4 wherein porous drainage levels comprise blankets of porous material.

6. A method as claimed at claim 5 wherein said blanket comprises a gravel layer overlaid by a layer of sand.

7. A method as claimed in claim 6 wherein the gravel layer is formed of clean gravel of approximately 2 to 30 mm sieve and fine sand of approximately 0.06 to 2 mm sieve.

8. A method as claimed at claim 7 wherein said gravel layer has a permeability of approximately $1 \times 10^{-4}$ m/s and said sand layer has a permeability of approximately $1 \times 10^{-5}$ m/s.

9. A method as claimed in claim 8 wherein the gravel layer has a thickness of approximately 0.30 meters and sand layers have a thickness of approximately 0.15 meters.

10. A method as claimed in claim 9 wherein at least one of the porous drainage levels further includes agricultural soil drains opening at the base of the exposed face of the bund.

11. A method as claimed at claim 10 wherein said agricultural type drains are angled obliquely to the decline of the porous drainage levels.

12. A method as claimed in claim 11 wherein the area to be covered by said tailings is rendered substantially impermeable prior to the formation of the porous drainage levels.

13. A method as claimed at claim 12 wherein said area is rendered impermeable by the laying and compaction of a layer of clay or other sealing material over said area.

14. A method as claimed in claim 13 wherein the slurry of fine tailings is pumped into the containment area immediately behind the bund.

15. A method as claimed at claim 14 wherein the fine tailings material is deposited behind the bund for the length thereof.

16. A method as claimed in claim 15 wherein said fine tailings material is also deposited substantially centrally within the containment area.

17. A method as claimed in claim 16 wherein the surface separated liquid is extracted from the surface of the deposited fine tailings.

18. A method as claimed at claim 1 wherein the bund is formed in stages where subsequent stages are supported by both the previously formed stage and drained consolidated tailings material adjacent said stage.

19. A method as claimed in claim 2 wherein the bund is formed in stages where subsequent stages are supported by both the previously formed stage and drained consolidated tailings material adjacent said stage.

20. A method as claimed in claim 1 wherein the porous drainage levels comprise blankets of porous material.

21. A method as claimed in claim 18 wherein the porous drainage levels comprise blankets of porous material.

22. A method as claimed in claim 19 wherein the porous drainage levels comprise blankets of porous material.

23. A method as claimed in claim 20 wherein the porous drainage levels comprise blankets of porous material.

24. A method as claimed in claim 6 wherein said gravel layer has a permeability of approximately $1 \times 10^{-4}$ m/s and said sand layer has a permeability of approximately $1 \times 10^{-5}$ m/s.

25. A method as claimed in claim 6 wherein the gravel layer has a thickness of approximately 0.30 meters and sand layers have a thickness of approximately 0.15 meters.

26. A method as claimed in claim 7 wherein the gravel layer has a thickness of approximately 0.30 meters and sand layers have a thickness of approximately 0.15 meters.

27. A method as claimed in claim 26 wherein the gravel layer has a thickness of approximately 0.30 meters and sand layers have a thickness of approximately 0.15 meters.

28. A method as claimed in claim 5 wherein one of the porous drainage levels further includes agricultural soil drains opening at the base of the front face of the bund.

29. A method as claimed in claim 6 wherein one of the porous drainage levels further includes agricultural soil drains opening at the base of the front face of the bund.

30. A method as claimed in claim 1 wherein the area to be covered by said tailings is rendered substantially impermeable prior to the formation of the porous drainage level.

31. A method as claimed in claim 2 wherein the area to be covered by said tailings is rendered substantially impermeable prior to the formation of the porous drainage level.

32. A method as claimed in claim 3 wherein the area to be covered by said tailings is rendered substantially impermeable prior to the formation of the porous drainage level.

33. A method as claimed in claim 4 wherein the area to be covered by said tailings is rendered substantially impermeable prior to the formation of the porous drainage level.

34. A method as claimed in claim 5 wherein the area to be covered by said tailings is rendered substantially impermeable prior to the formation of the porous drainage level.

35. A method as claimed in claim 6 wherein the area to be covered by said tailings is rendered substantially impermeable prior to the formation of the porous drainage level.

36. A method as claimed in claim 10 wherein the area to be covered by said tailings is rendered substantially impermeable prior to the formation of the porous drainage level.

37. A method as claimed in claim 1 wherein the slurry of fine tailings is pumped into the containment area immediately behind the bund.

38. A method as claimed in claim 2 wherein the slurry of fine tailings is pumped into the containment area immediately behind the bund.

39. A method as claimed in claim 3 wherein the slurry of fine tailings is pumped into the containment area immediately behind the bund.

40. A method as claimed in claim 4 wherein the slurry of fine tailings is pumped into the containment area immediately behind the bund.

41. A method as claimed in claim 5 wherein the slurry of fine tailings is pumped into the containment area immediately behind the bund.

42. A method as claimed in claim 6 wherein the slurry of fine tailings is pumped into the containment area immediately behind the bund.

43. A method as claimed in claim 10 wherein the slurry of fine tailings is pumped into the containment area immediately behind the bund.

44. A method as claimed in claim 11 wherein the slurry of fine tailings is pumped into the containment area immediately behind the bund.

45. A method as claimed in claim 12 wherein the slurry of fine tailings is pumped into the containment area immediately behind the bund.

46. A method as claimed in claim 14 wherein said fine tailings material is also deposited substantially centrally within the containment area.

47. A method as claimed in claim 1 wherein the surface separated liquid is extracted from the surface of the deposited fine tailings.

48. A method as claimed in claim 2 wherein the surface separated liquid is extracted from the surface of the deposited fine tailings.

49. A method as claimed in claim 3 wherein the surface separated liquid is extracted from the surface of the deposited fine tailings.

50. A method as claimed in claim 4 wherein the surface separated liquid is extracted from the surface of the deposited fine tailings.

51. A method as claimed in claim 5 wherein the surface separated liquid is extracted from the surface of the deposited fine tailings.

52. A method as claimed in claim 6 wherein the surface separated liquid is extracted from the surface of the deposited fine tailings.

53. A method as claimed in claim 10 wherein the surface separated liquid is extracted from the surface of the deposited fine tailings.

54. A method as claimed in claim 11 wherein the surface separated liquid is extracted from the surface of the deposited fine tailings.

55. A method as claimed in claim 13 wherein the surface separated liquid is extracted from the surface of the deposited fine tailings.

56. A method as claimed in claim 14 wherein the surface separated liquid is extracted from the surface of the deposited fine tailings.

57. A method as claimed in claim 15 wherein the surface separated liquid is extracted from the surface of the deposited fine tailings.

* * * * *

UNITED STATES PATENT AND TRADEMARK OFFICE
CERTIFICATE OF CORRECTION

PATENT NO. : 4,541,752

DATED : September 17, 1985

INVENTOR(S) : John T. Phillips

It is certified that error appears in the above-identified patent and that said Letters Patent is hereby corrected as shown below:

Column 3, line 47, after "mud" insert --which--.

Column 4, line 67, "careful" should be --carefully--.

Column 5, line 62, "enbankment" should be --embankment--.

Column 6, line 29, "shows" should be --show--.

Column 8, line 29, Claim 27, "26" should be --24--.

Signed and Sealed this

Twenty-eighth Day of October, 1986

[SEAL]

Attest:

DONALD J. QUIGG

*Attesting Officer*   *Commissioner of Patents and Trademarks*